US009368945B1

(12) United States Patent
Sharp

(10) Patent No.: US 9,368,945 B1
(45) Date of Patent: Jun. 14, 2016

(54) ISOLATED BOLT-ON CIRCUIT BREAKER SYSTEM FOR AN ENERGIZED PANELBOARD

(71) Applicant: SCHNEIDER ELECTRIC USA, INC., Palatine, IL (US)

(72) Inventor: Jeffrey O. Sharp, Murfreesboro, TN (US)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 8 days.

(21) Appl. No.: 14/578,478

(22) Filed: Dec. 21, 2014

(51) Int. Cl.
*H02B 1/06* (2006.01)
*H02B 1/04* (2006.01)

(52) U.S. Cl.
CPC . *H02B 1/06* (2013.01); *H02B 1/042* (2013.01)

(58) Field of Classification Search
CPC .......... H02B 1/16; H02B 11/28; H02B 1/056; H01R 13/648; H01R 13/748
See application file for complete search history.

(56) References Cited

U.S. PATENT DOCUMENTS

| | | | |
|---|---|---|---|
| 2,530,548 A | 12/1950 | Stanley | |
| 3,404,315 A | 10/1968 | Jacobs et al. | |
| 4,667,268 A * | 5/1987 | Mrowka | H02B 1/056 174/138 F |
| 4,916,574 A * | 4/1990 | Hancock | H02B 1/21 174/149 B |
| 5,113,312 A * | 5/1992 | Pratt | H02B 1/14 361/611 |
| 5,272,591 A * | 12/1993 | Blue | H02B 1/06 361/622 |
| 5,272,592 A * | 12/1993 | Harris | H02B 1/20 361/637 |
| 5,295,042 A * | 3/1994 | Midgley | H02B 1/21 361/634 |
| 5,301,086 A * | 4/1994 | Harris | H02B 1/06 361/641 |
| 5,761,026 A * | 6/1998 | Robinson | H02B 1/056 200/303 |
| 6,472,605 B1 * | 10/2002 | Griffith | H02B 1/056 174/101 |
| 7,005,590 B1 | 2/2006 | Willis | |
| 7,011,551 B2 | 3/2006 | Johansen et al. | |
| 8,223,475 B2 | 7/2012 | Baird et al. | |
| 8,333,600 B2 | 12/2012 | Yanniello | |
| 2008/0087536 A1 | 4/2008 | Besana et al. | |
| 2010/0238611 A1 | 9/2010 | Deboer et al. | |
| 2013/0140915 A1 | 6/2013 | Spitaels et al. | |

FOREIGN PATENT DOCUMENTS

| | | |
|---|---|---|
| WO | 2014/209317 | 12/2014 |
| WO | 2015/047371 | 4/2015 |

OTHER PUBLICATIONS

PCT Search Report for PCT Application No. PCT/US13/48128 dated Dec. 3, 2013.
PCT Search Report for PCT Application No. PCT/US13/62552 dated Feb. 17, 2014.

* cited by examiner

*Primary Examiner* — Gregory Thompson
(74) *Attorney, Agent, or Firm* — Locke Lord LLP

(57) ABSTRACT

Methods and systems for minimizing exposure to live parts in a panelboard allow safe insulation and removal of a circuit breaker or other electrical devices from the panelboard. The methods and systems provide an isolation assembly for the panelboard that isolates and prevents contact with energized portions of the circuit breaker as well as the conductors in the panelboard. The isolation assembly covers up the energized part of the circuit breaker, including the line terminal extending from the circuit breaker, and any accessible portion of the conductors in the panelboard. Additionally, for bolt-on type circuit breakers, the isolation assembly replaces the bolts or screws typically used to fasten the line terminals to the conductors in the panelboard with standoff screws that insulate metal screwdrivers and similar tools from the energized part of the circuit breaker.

15 Claims, 5 Drawing Sheets

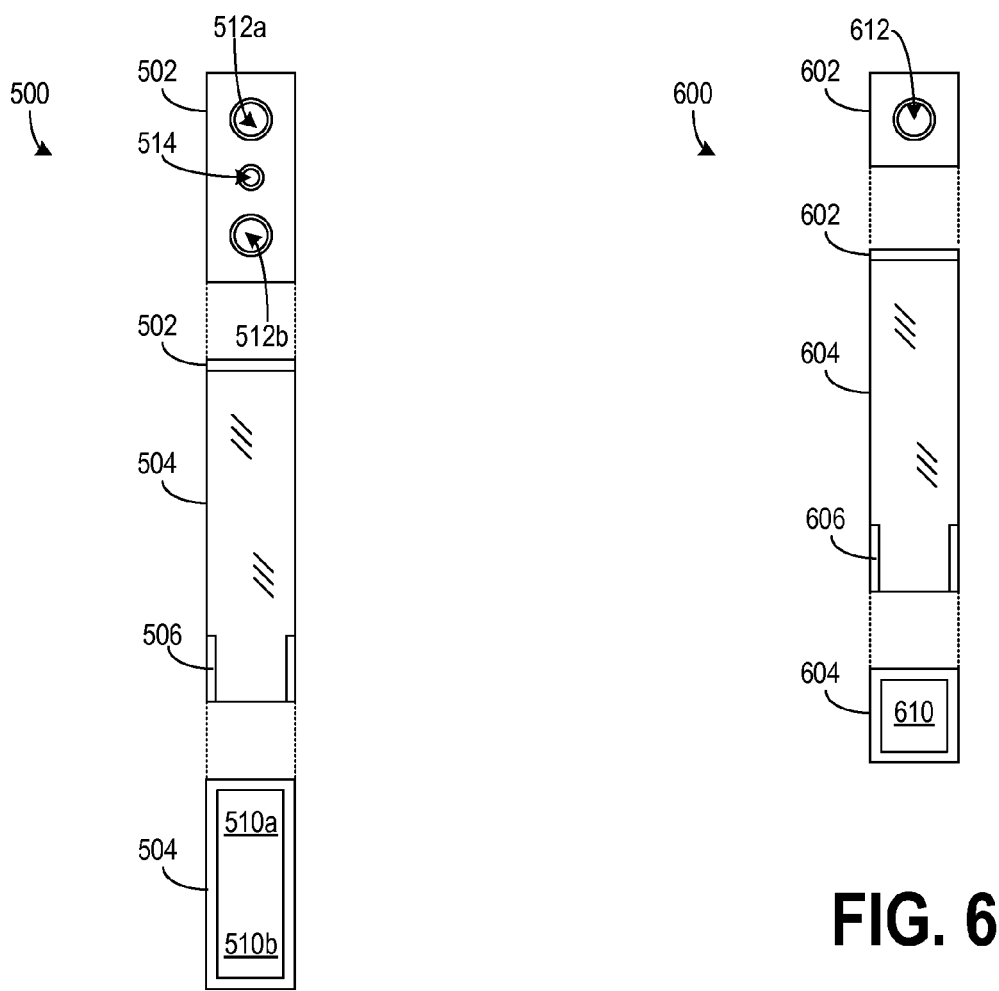

ISOLATED BOLT-ON CIRCUIT BREAKER SYSTEM FOR AN ENERGIZED PANELBOARD

FIELD OF THE INVENTION

The present disclosure relates to methods and systems for installing and removing a circuit breaker from an electrical panel or panelboard, and more particularly to a method and system for reducing the chances of exposure to live parts in the panelboard.

BACKGROUND OF THE INVENTION

An electrical panel or panelboard has a main bus and individual connection points on the bus that are connectable to electrical devices, such as circuit breakers for branch conductors and any other electrical devices designed to be installed for a branch circuit. Because the circuit breakers and other branch electrical devices are typically mounted directly to the panelboard, an operator and/or tools may come in contact with exposed conductors in the panelboard when installing or removing the circuit breakers from the panelboard. Bolt-on type circuit breakers are particularly problematic because their line terminals are fastened to the conductors by a bolt or screw and contact with a potentially energized bolt is needed to screw and unscrew the bolt. Thus, although insulated screwdrivers and similar insulated tools are available, it is recommended that power be shut off to the panelboard as a precaution when electrical devices are being installed or removed. However, it may be considered desirable in some cases to keep the panelboard energized to prevent an electrical hazard as a consequence of deenergization, or operators may intentionally keep the power on in the interest of saving time. Moreover, shutting off power to the panelboard can be a major inconvenience, particularly for data centers, hospitals, and other critical applications that require a high availability power source.

Thus, a need exists for an improved way to safely install and remove a circuit breaker or other branch electrical devices from an electrical panel as part of a larger scheme for installing and removing branch circuit devices without deenergizing the electrical panel.

SUMMARY OF THE DISCLOSED EMBODIMENTS

The embodiments disclosed herein are directed to methods and systems for reducing the possibility of exposure to live parts in a panelboard and safely installing and removing a circuit breaker or other branch electrical devices from the panelboard. The disclosed embodiments provide an isolation assembly for the panelboard that prevents contact with energized portions of the circuit breaker as well as the conductors in the panelboard. Specifically, the isolation assembly covers up the energized parts of the circuit breaker, including the line terminal extending from the circuit breaker, and any accessible portion of the conductors in the panelboard. Additionally, for bolt-on type circuit breakers, conventional bolts or screws typically used to fasten the line terminals to the conductors are replaced with standoff screws that have extended lengths and that also insulate metal screwdrivers and similar tools from the energized part of the circuit breaker. Use of such an isolation assembly allows operators to safely install and remove bolt-on and other types of circuit breakers from the panelboard while also minimizing exposure to energized parts on the panelboard.

In some implementations, the isolation assembly comprises an electrically nonconductive enclosure or housing composed of four side walls and a cover on top of the side walls. The housing has a size and shape such that it may be placed on the panelboard over the line terminal of a circuit breaker, or the line terminals of several circuit breakers, such that the housing substantially surrounds the line terminals, leaving little or no room for tools or fingers to access the line terminals or any accessible portion of the conductors in the panelboard. The cover has a series of openings formed therein, each of which substantially aligns with a bore hole in the circuit breaker line terminal when the circuit breaker and the housing are mounted on the panelboard. Standoff screws may then be inserted through the openings in the cover to fasten the circuit breaker line terminals to the panelboard (and the conductors therein). The extended length of the standoff screws allows them to be fastened from a distance, i.e., without requiring an operator to reach down around the line terminals with a screwdriver or similar tool. Each standoff screw has a threaded shaft portion and a head portion with a keyhole having a specific shape or configuration, such as a star, hexagon, and the like, connected to the shaft portion. An electrically nonconductive cap having a corresponding key protruding therefrom may be fitted on or over the head portion of the standoff screw. The electrically nonconductive cap may accommodate a conventional screwdriver, such as a flathead or Phillips screwdriver, that allows the cap, and hence the standoff screw, to be tightened using conventional tools. This arrangement obviates the need for insulated screwdrivers and the like to fasten the line terminals of the circuit breaker to the conductors of the panelboard.

In some implementations, a spring or other biasing member may be used to lift the standoff screws up at least partially out of the housing for convenient removal when the standoff screws are unfastened from the line terminal. In some implementations, the cover may be an integral part of the housing so that the cover and the sidewalls of the housing form a single piece. In some implementations, the cover may be a separate component that is removably attached to the sidewalls of the housing. In some implementations, the isolation assembly may be a single line phase isolation assembly. In some implementations, the isolation assembly may be a multiple line phase isolation assembly. In some implementations, the isolation assembly itself may be fastened to the panelboard via screws inserted through respective openings in the cover of the housing. In some implementations, the line terminal of the circuit breaker may be lengthened by a predefined amount in order further to offset the standoff screw from the circuit breaker.

In general operation, to install a circuit breaker in a panelboard, the isolation assembly is mounted on the panelboard adjacent to a circuit breaker slot so the isolation assembly covers up or otherwise blocks access to the conductors in the panelboard. The circuit breaker is then placed on the panelboard in the breaker slot, with the circuit breaker line terminal inserted under the isolation assembly over the conductors in the panelboard. A standoff screw having the aforementioned nonconductive cap is then inserted in the cover of the isolation assembly through an opening therein and lined up with the bore hole in the circuit breaker line terminal. The standoff screw is then turned using a conventional screwdriver, such as a flathead or Phillips screwdriver, to fasten the circuit breaker line terminal to the conductors of the panelboard.

In some implementations, it is also possible to place the circuit breaker on the panelboard first before installing the isolation assembly. Once the circuit breaker is in position, the isolation assembly is placed on the panelboard adjacent to the circuit breaker so the isolation assembly covers up the circuit breaker line terminal, blocking access to the line terminal. The standoff screw is then inserted through the opening in the cover of the isolation assembly so it is lined up with the bore hole in the circuit breaker line terminal and turned to fasten the circuit breaker line terminal to the live conductors of the panelboard.

In general, in one aspect, the disclosed embodiments are directed to an isolation assembly for an electrical panelboard. The isolation assembly comprises, among other things, an electrically nonconductive housing configured to substantially surround at least one line terminal of a circuit breaker when the isolation assembly is mounted on the panelboard. The isolation assembly also comprises a cover disposed on top of the housing, the cover having at least one opening therein that is positioned substantially directly over the at least one line terminal of the circuit breaker when the isolation assembly and the circuit breaker are mounted on the panelboard. The isolation assembly further comprises a standoff screw disposed in one of the at least one opening of the cover, the standoff screw having a head portion and a threaded shaft portion, the threaded shaft portion configured to fasten the at least one line terminal of the circuit breaker to the panelboard. An electrically nonconductive cap is disposed on the head portion of the standoff screw, the electrically nonconductive cap configured to be turned using a conventional tool to tighten the standoff screw.

BRIEF DESCRIPTION OF THE DRAWINGS

The foregoing and other advantages of the disclosed embodiments will become apparent upon reading the following detailed description and upon reference to the drawings, wherein:

FIG. 5 is another exemplary isolation assembly according to one or more embodiments disclosed herein; and FIG. 6 is yet another exemplary isolation assembly according to one or more embodiments disclosed herein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1A:
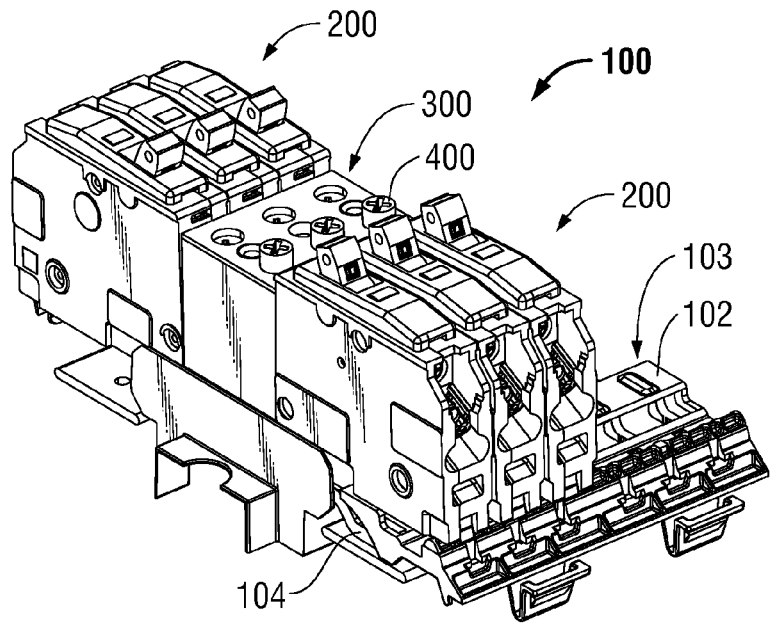
FIGS. 1A-1C are perspective views of an exemplary isolation assembly mounted on a panelboard according to one or more embodiments disclosed herein.
Figure 1B:
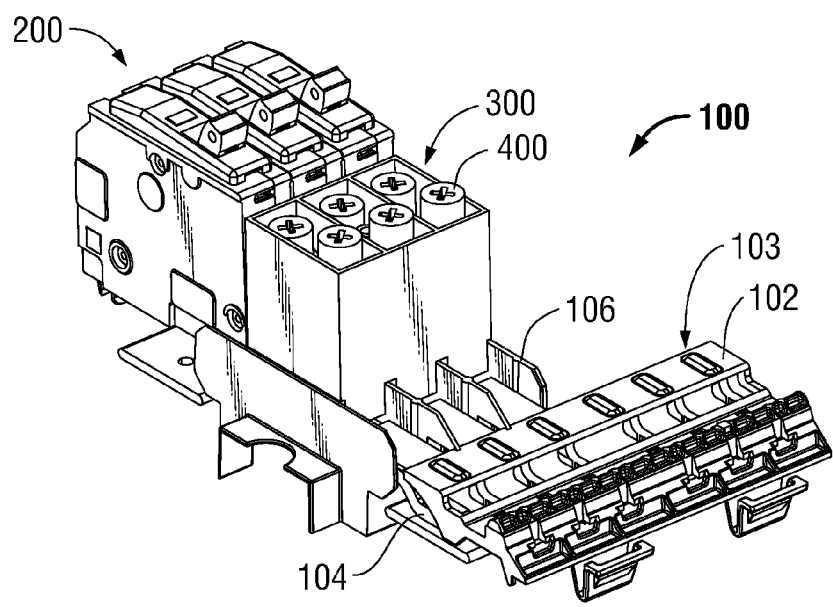
Figure 1C:
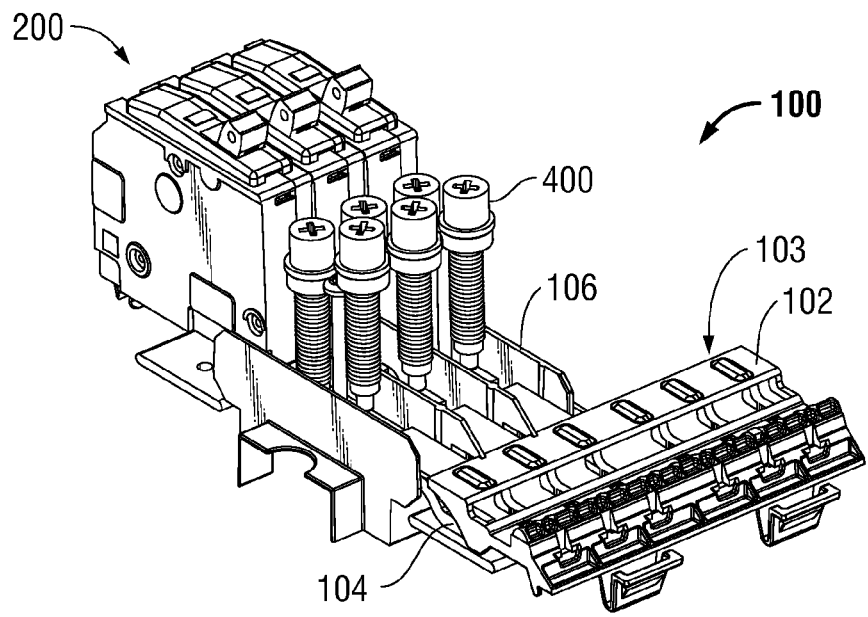

Referring now to FIGS. 1A-1C, a panelboard 100 is shown according to the disclosed embodiments. As is typically done, the panelboard 100 includes a circuit breaker mounting assembly 102 having a series of mounting slots, one indicated at 103, on which circuit breakers 200 may be mounted, typically one row of circuit breakers on each side of the panelboard 100. In the example shown here, the circuit breakers 200 are 3-pole circuit breakers that have a bolt-on line terminal for each pole. Such bolt-on type circuit breakers 200 typically have the line terminals bolted or screwed to conductors (e.g., busbars) in the panelboard 100, one of which is indicated at 104, with conventional bolts or screws. There are two such circuit breakers 200 depicted in FIG. 1A, one on each side of the panelboard 100, whereas FIGS. 1B and 1C show one of the circuit breakers 200 removed to reveal blade like phase barriers 106 separating the different poles of the circuit breakers 200. Other types of circuit breakers 200 may also be used, for example, single-pole circuit breakers, 2-pole circuit breakers, and the like, without departing from the scope of the disclosed embodiments.

In accordance with the disclosed embodiments, an isolation assembly 300 is provided for the panelboard 100 that prevents contact with the line terminals of the circuit breakers 200 as well as the conductors 104 in the panelboard 100. The isolation assembly 300 covers up and substantially surrounds the line terminals of the circuit breakers 200, leaving little or no room for tools or fingers to access the line terminals or any accessible portion of the conductors 104 in the panelboard 100. Standoff screws 400 having extended lengths may then be used to fasten the line terminals to the conductors 104 instead of conventional bolts or screws. The extended lengths of the standoff screws 400 allow operators to fasten the screws from a distance rather than reaching down around the energized line terminals. Such an isolation assembly 300 reduces the chance of inadvertent contact with energized portions of the circuit breaker 200 and panelboard 100 while allowing operators to safely install and remove bolt-on and other types of circuit breakers 200 from the panelboard 100.

Figure 2:
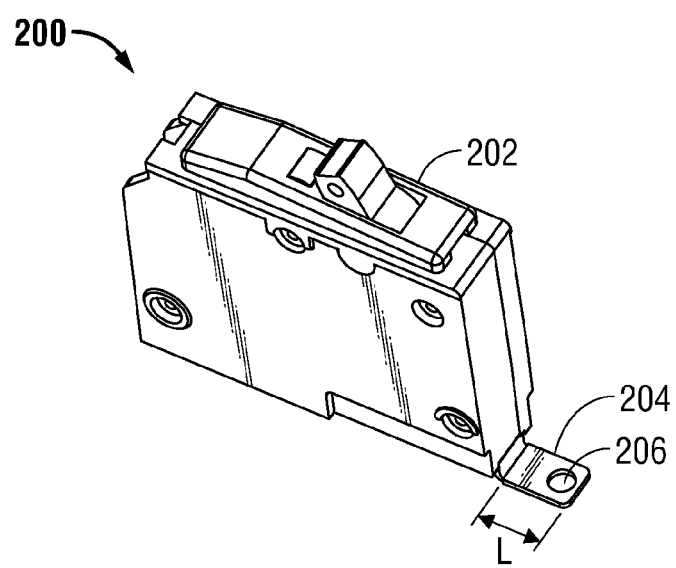
FIG. 2 is an exemplary circuit breaker that may be used with an exemplary isolation assembly according to one or more embodiments disclosed herein.

An example of a bolt-on type circuit breaker 200 that may be used with the isolation assembly 300 disclosed herein is depicted in FIG. 2. The circuit breaker 200 shown here resembles a typical single-pole bolt-on circuit breaker insofar as it has an outer casing 202 and a bolt-on line terminal 204 protruding from the back side of the casing 202. A bore hole 206 in the line terminal 204 allows bolts or screws to be inserted to fasten the line terminal 204 to the panelboard 100. As an additional safety measure, in some embodiments, the line terminal 204 of the circuit breaker 200 may have an extended length "L" that is longer (e.g., 25%, etc.) than the line terminals of conventional bolt-on circuit breakers. The extended length line terminal 204 offsets the bore hole 206 further away from the circuit breaker 200, leaving a larger area adjacent to the circuit breaker 200 in which the isolation assembly 300 may be mounted.

Figure 3:
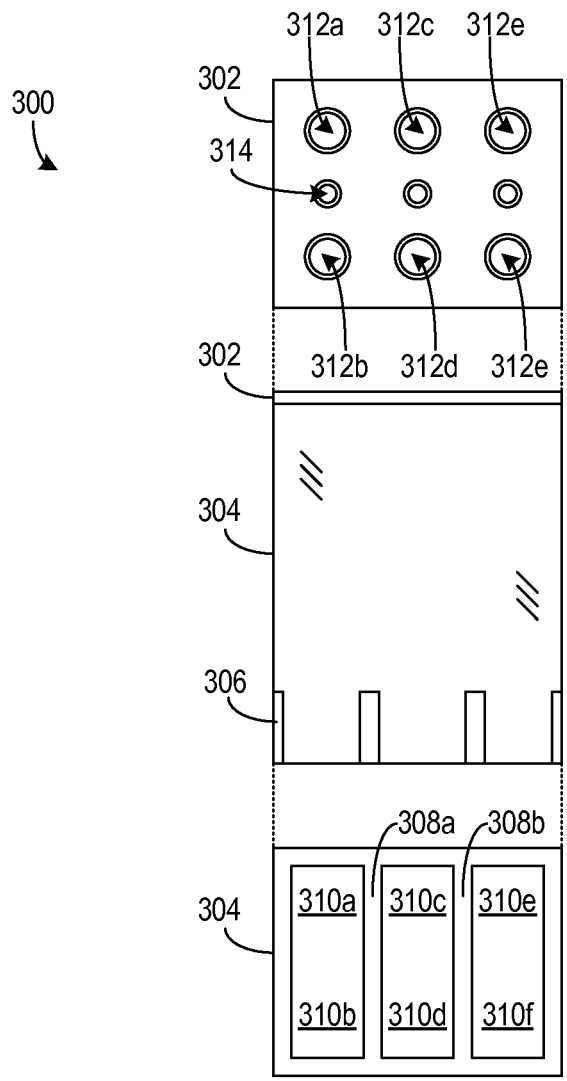
FIGS. 3A-3C show various views of an exemplary isolation assembly according to one or more embodiments disclosed herein.

The isolation assembly 300 itself is depicted in FIGS. 3A-3C, where FIG. 3A shows a plan view of the isolation assembly 300, FIG. 3B shows a profile view of the isolation assembly 300, and FIG. 3C is a view looking into the isolation assembly 300. As can be seen, the isolation assembly 300 comprises an electrically nonconductive enclosure or housing 304 composed of four side walls and a cover 302 disposed on top of the side walls. In the example shown here, the housing 304 has a size and shape that is large enough to accommodate the line terminals 204 for two 3-pole circuit breakers 200 (i.e., six line terminals from two circuit breakers, one circuit breaker on each side of the panelboard), without leaving room for tools or fingers to access the line terminals 204 or any accessible portion of the conductors 104 in the panelboard 100. As best seen in FIG. 3B, several slits 306 are formed in the lower half of two of the side walls, specifically the two that are adjacent to the circuit breakers 200, in order to accommodate the phase barriers 106 when the isolation assembly 300 is mounted on the panelboard 100.

As best seen in FIG. 3C, in some embodiments, the housing 304 has internal partitions 308a and 308b that divide the space within the housing 304 into several compartments. These compartments isolate the line terminals 204 of each circuit breaker pole from one another and also help align the standoff screws 400 that fasten the line terminals 204 to the panelboard 100 with each screw's respective line terminal 204. There are three such compartments here, each compartment defining a space for two standoff screws 400 corresponding to two line terminals 204, one line terminal 204 from one pole of one circuit breaker 200, and one line terminal 204 from one pole of the other circuit breaker. Specifically, the leftmost compartment defines spaces 310a and 310b for two standoff screws, the middle compartment defines spaces 310c and 310d for two more standoff screws, and the rightmost compartment defines spaces 310e and 310f for yet two more standoff screws.

As best seen in FIG. 3A, a series of standoff holes or openings are provided in the cover 302, which may be integrated with the housing 304 or provided as a separate piece, for receiving the standoff screws 400 that fasten the line terminals 204 to the conductors 104. In the example shown here, there are six standoff holes in the cover 302 regularly spaced apart from one another such that the holes are positioned substantially directly over the circuit breaker line terminals 204 when the isolation assembly 300 is mounted on the panelboard 100. When the standoff screws 400 are inserted in the standoff holes, each screw substantially aligns with its respective circuit breaker line terminal 204. This results in the leftmost standoff holes 312a and 312b being positioned directly over spaces 310a and 310b in the housing 304, the middle standoff holes 312c and 312d being positioned directly over spaces 310c and 310d in the housing, and the rightmost standoff holes 312e and 312f being positioned directly over spaces 310e and 310f in the housing.

In some embodiments, mounting holes 314 may also be provided in the cover 302 for receiving mounting screws (not expressly shown) in the cover 302. The mounting screws may be fastened to corresponding mounting holes in the panelboard 100 to secure the cover 302, and hence the isolation assembly 300, to the panelboard. In other embodiments, instead of mounting screws, the standoff holes 312a-f may be tapered holes and the standoff screws 400 may have corresponding tapered head portions, such that fastening the standoff screws 400 secures both the circuit breaker line terminals 204 and the isolation assembly 300 to the panelboard 100.

Figure 4:
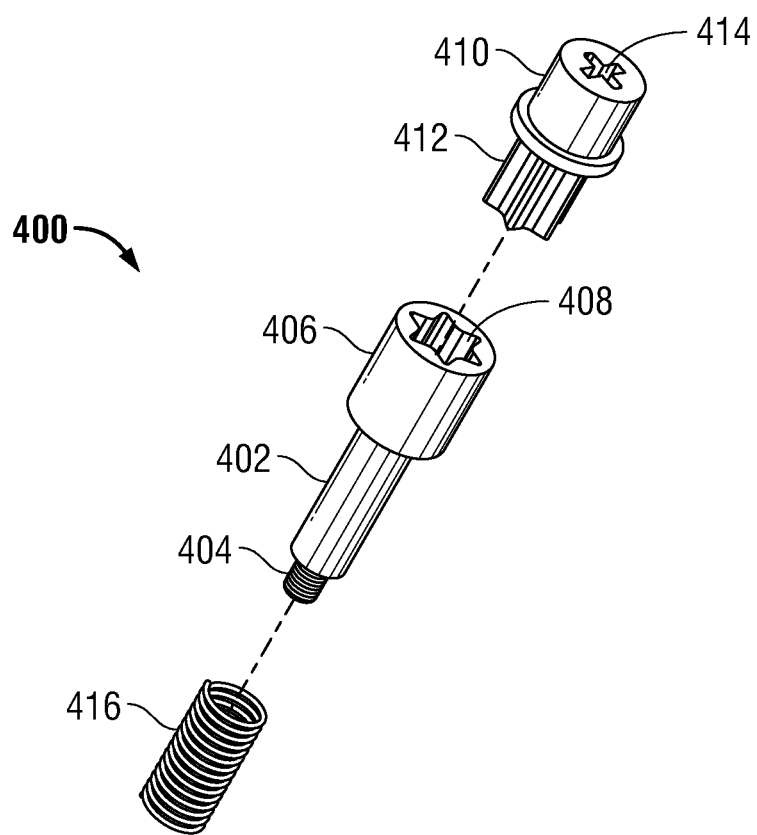
FIG. 4 is an exemplary standoff screw for an exemplary isolation assembly according to one or more embodiments disclosed herein.

An example of the standoff screw 400 that may be used to fasten the line terminals 204 to the conductors 104 in the panelboard 100 is portrayed in FIG. 4. As mentioned above, the standoff screws 400 have an extended length that allows them to be fastened from a distance so an operator does not have to reach down around the line terminals 204 with a screwdriver or similar tool. Each standoff screw 400 has a shaft or shank 402 having a threaded end portion 404 and a head portion 406 with a keyhole 408 formed therein. The keyhole 408 may have a specific shape or configuration, such as a star, hexagon, and the like, that requires a specific corresponding key. An electrically nonconductive cap 410 having a corresponding key 412 protruding therefrom may then be fitted on or over the head portion 406 so that the key 412 fits precisely within the keyhole 408. As well, the electrically nonconductive cap 410 may be configured to accept a conventional screwdriver, such as a flathead or Phillips screwdriver, that allows the cap 410, and hence the standoff screw 400, to be tightened. In the example shown, the nonconductive cap 410 has a conventional Phillips screwdriver slot 414, but other conventional tool slots may certainly be used without departing from the embodiments disclosed herein. In any event, such a standoff screw 400 obviates the need for insulated screwdrivers and the like to fasten the line terminals 204 of the circuit breaker 200 to the conductors 104 of the panelboard 100. In some embodiments, a spring or other biasing member 416 may be disposed around the shaft or shank 402 to lift up the standoff screw 400 at least partially out of the housing 304 for convenient removal when the screw is unfastened from the line terminal.

In general operation, to install the circuit breaker 200 in the panelboard 100, the isolation assembly 300 is mounted on the panelboard 100 adjacent to a circuit breaker slot 103 so the isolation assembly covers up or otherwise blocks access to the conductors 104 in the panelboard. The circuit breaker 200 is then placed on the panelboard 100 in the breaker slot 103, with the circuit breaker line terminal 204 inserted under the isolation assembly 300 over the conductors 104 in the panelboard. A standoff screw 400 having the nonconductive cap 410 mentioned above is then inserted in the cover 302 of the isolation assembly 300 through one of the openings 312a-f therein so it is lined up with the bore hole 206 in the circuit breaker line terminal 204. The standoff screw 400 is then turned using a conventional screwdriver, such as a flathead or Phillips screwdriver, to fasten the circuit breaker line terminal 204 to the conductors 104 of the panelboard 100.

Alternatively, in some embodiments, the circuit breaker 200 may be placed on the panelboard 100 before installing the isolation assembly 300. With the circuit breaker 200 in place on the panelboard 100, the isolation assembly 300 is then positioned on the panelboard 100 adjacent to the circuit breaker so the isolation assembly covers up the circuit breaker line terminal 204, blocking access to the line terminal. The standoff screw 400 is then mounted through one of the openings 312a-f in the cover 302 of the isolation assembly 300 so it is lined up with the bore hole 206 in the circuit breaker line terminal 204 and turned to fasten the circuit breaker line terminal 204 to the live conductors 104 of the panelboard 100.

Thus far, a multi-line phase isolation assembly has been shown and described. FIG. 5 depicts an example of single-line phase isolation assembly 500 in accordance with one or more disclosed embodiments. This isolation assembly 500 has a housing 504 that is large enough to accommodate only two circuit breaker line terminals 204, one from each circuit breaker 200. Slits 506 may be formed in the lower half of the housing 504 for receiving the phase barriers 106 separating the different poles of the circuit breakers 200. As can be seen, the housing 504 defines only two spaces 510a and 510b for two standoff screws 400. Likewise, the cover 502 has only two standoff holes or openings 512a and 512b for receiving the two standoff screws 400. A mounting hole 514 may be provided in some embodiments for inserting a mounting screw (not expressly shown) to secure the isolation assembly 500 to the panelboard 100. Alternatively, in some embodiments, instead of a mounting screw, the standoff holes 512*a-b* may be tapered holes and the standoff screws 400 may have corresponding tapered head portions for securing the isolation assembly 500 to the panelboard 100.

FIG. 6 shows an example of an isolation assembly designed for only a single line terminal 204 according to one or more embodiments. This isolation assembly 600 has a housing 604 that is large enough to accommodate only one circuit breaker line terminal. Slits 606 may be formed in the lower half of the housing 604 for the phase barriers 106 separating the different poles of the circuit breakers 200. As this figure shows, the housing 604 has only one space 610 for one standoff screw. Likewise, the cover 602 has only one standoff hole or opening 612 for receiving the one standoff screw.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A isolation assembly for an electrical panelboard, comprising:
   an electrically nonconductive housing configured to substantially surround at least one line terminal of a circuit breaker when the isolation assembly is mounted on the panelboard;
   a cover disposed on top of the housing, the cover having at least one opening therein that is positioned substantially directly over the at least one line terminal of the circuit breaker when the isolation assembly and the circuit breaker are mounted on the panelboard;
   a standoff screw disposed in one of the at least one opening of the cover, the standoff screw having a head portion and a threaded shaft portion, the threaded shaft portion configured to fasten the at least one line terminal of the circuit breaker to the panelboard; and
   an electrically nonconductive cap disposed on the head portion of the standoff screw, the electrically nonconductive cap configured to be turned using a conventional tool to tighten the standoff screw.

2. The isolation assembly of claim 1, wherein the head portion of the standoff screw has a keyhole formed therein and the electrically nonconductive cap has a key extension protruding therefrom that fits within the keyhole in the head portion of the standoff screw.

3. The isolation assembly of claim 2, wherein the keyhole in the head portion of the standoff screw is a star-shaped or hexagon-shaped keyhole.

4. The isolation assembly of claim 1, further comprising a biasing member coupled to the standoff screw and configured to lift the standoff screw at least partially from the cover.

5. The isolation assembly of claim 1, wherein the housing includes internal partitions that divide the housing into a plurality of compartments within the housing.

6. The isolation assembly of claim 5, wherein each compartment accommodates at least one line terminal.

7. The isolation assembly of claim 1, wherein the isolation assembly is a single phase isolation assembly.

8. The isolation assembly of claim 1, wherein the isolation assembly is a multi-phase isolation assembly.

9. The isolation assembly of claim 1, wherein the cover has at least one mounting hole therein for receiving a mounting screw, the mounting screw securing the isolation assembly to the panelboard.

10. The isolation assembly of claim 1, wherein the isolation assembly is mounted on the panelboard, the panelboard including a plurality of breaker slots, each breaker slot providing access to conductors in the panelboard.

11. The isolation assembly of claim 10, wherein the circuit breaker is mounted in one of the breaker slots in the panelboard.

12. The isolation assembly of claim 11, wherein the circuit breaker is a bolt-on type circuit breaker.

13. The isolation assembly of claim 11, wherein the line terminal of the circuit breaker is lengthened by a predefined percentage.

14. The isolation assembly of claim 11, wherein the circuit breaker is a three-pole circuit breaker.

15. The isolation assembly of claim 10, wherein the panelboard comprises blade like phase barriers and the housing has slits formed therein for receiving the phase barriers.

* * * * *